Dec. 5, 1944.  R. W. WALDO ET AL  2,364,329
TURRET ATTACHMENT FOR LATHES
Filed Feb. 27, 1943  2 Sheets-Sheet 1

Inventors
Russell W. Waldo
Leon J. Ratte
By John E. Stryker Jr.
Attorney

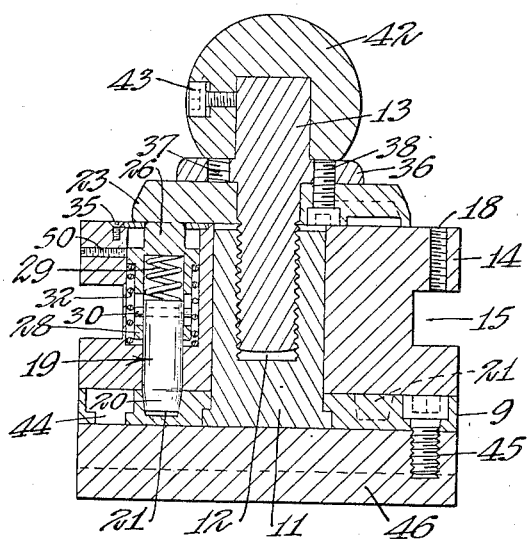

Patented Dec. 5, 1944

2,364,329

UNITED STATES PATENT OFFICE 2,364,329

TURRET ATTACHMENT FOR LATHES

Russell W. Waldo and Leon J. Ratte,
St. Paul, Minn.

Application February 27, 1943, Serial No. 477,432

7 Claims. (Cl. 29—49)

This invention relates to a turret whereby a number of tools may be mounted on the tool rest of a lathe and severally brought to working position quickly and by simply operating a crank handle.

Our principal objects are to provide an unusually simple, inexpensive, reliable and compact turret of this class whereby the several tools may be brought to working position with indexing precision.

The invention also includes certain novel features of construction which will be pointed out in the following specification and claims.

Referring to the accompanying drawings:

Fig. 3 is a vertical cross section taken approximately on the line 3—3 of Fig. 2;

Fig. 4 is a plan view of the base plate and spindle;

Fig. 5 is a bottom plan view of the motivating cam;

Fig. 6 is an upper end view of the clamp screw and flange, and

Figs. 7 and 8 are vertical sections taken approximately on the line 7—7 of Fig. 2, and showing the pin respectively in locked and unlocked positions relative to the base plate and a development of the motivating cam.

Figure 1:
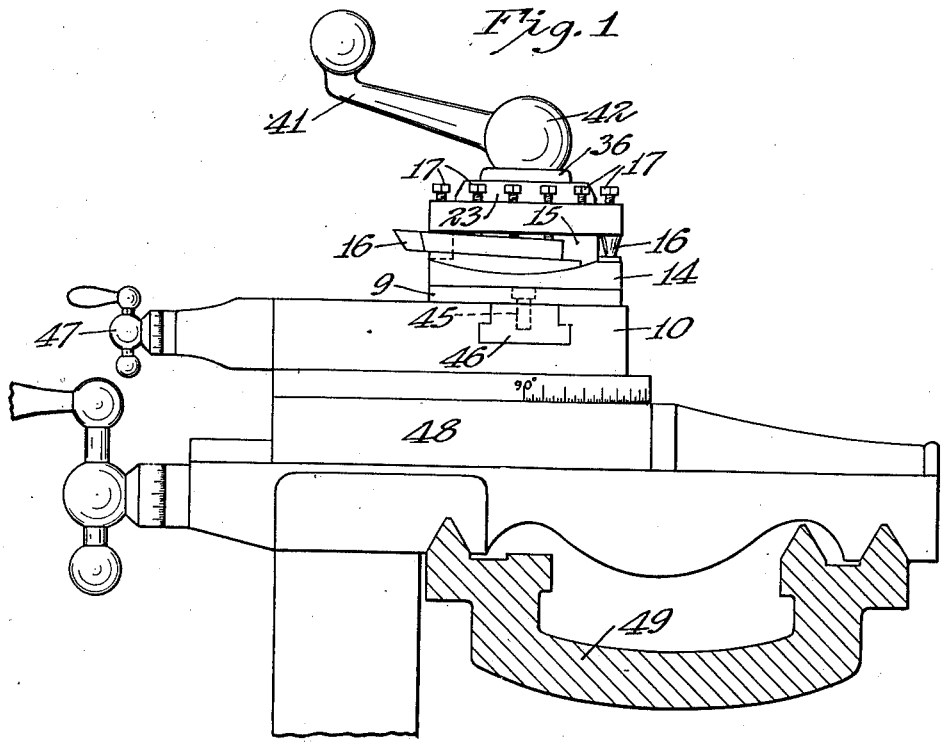
Figure 1 is a side elevation showing our improved turret mounted on a lathe of common type, the bed of the lathe being shown in cross section.
Figure 2:
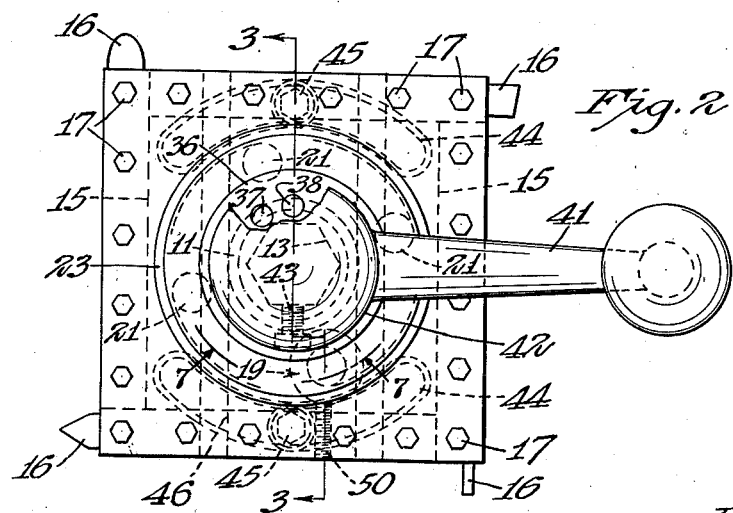
Fig. 2 is a plan view of the device with a fragmentary portion broken away to show parts otherwise concealed.

We provide a flat, low base plate 9 adapted to be fastened in various angular positions on the tool rest 10 of a lathe. Rising centrally from the base and rigidly connected thereto is a cylindrical spindle 11 formed with a threaded bore 12 adapted to receive a screw 13 for clamping a tool holder 14 on the plate 9. This tool holder is journaled on the spindle 11 and is generally rectangular, having a horizontally extending groove 15 in each of its vertical sides to receive a tool. The tools, indicated by the numerals 16, are of the several types ordinarily required for use. They may be clamped in the grooves 15 by suitable means such as the set screws 17 threaded in tapped holes 18 in the tool holder (Figs. 1, 2 and 3).

An indexing pin, indicated generally by the numeral 19, is mounted in a vertically extending bore drilled in the holder 14 eccentrically to the spindle 11. This pin has a lower end member 20 of truncated conical shape adapted to fit into either of the indexing recesses 21 which are formed in the base plate 9 in regularly spaced relation to each other and at equal radial distances from the axis of the spindle 11. Inclined, arcuate cam ways 22 are severally associated with the indexing recesses 21, being formed in the plate 9, each at an incline from an elevation slightly below the upper surface of the plate and merging into the upper surface thereof at their ends remote from the recesses respectively. As shown in Fig. 4, each cam way 22 extends in a counterclockwise direction from the associated recess 21.

A motivating cam, indicated generally by the numeral 23, is mounted on the screw 13 adjacent to the upper surface of the tool holder 14 and is formed with inclined, arcuate cam surfaces 24 each terminating at one end in a shoulder 25 adapted to engage an upper end member 26 of the pin 19. The number of cam surfaces 24 and shoulders 25 corresponds to the number of tools to be indexed in working position.

Details of our indexing pin 19 are shown in Figs. 3, 7 and 8. Spaced downward from the upper end of member 26 is an integral flange 27 and a sleeve 28 having an open lower end from which the member 20 of the pin projects axially. A coiled spring 29 is confined in the sleeve 28 to normally extend the member 20 of the pin downward relative to the upper member 26. To limit relative movement of these members, a small cross pin 30 projects from the member 20 into vertical guide slots 31 formed in the sleeve 28. The spring 29 is under compression when the pin 30 is in engagement with the lower extremities of the slots 31. A second helical spring 32 is confined about the exterior of the sleeve 28 in an enlargement 33 of the bore containing the index pin. This spring 32 is held under compression between the flange 27 and lower extremity of the bore 33 so that the indexing pin is normally urged upward, out of indexing position, to a position where the flange 27 abuts against a retaining ring 34 mounted in an annular recess in the upper face of tool holders 14. The retaining ring 34 is held in place by small counter-sunk screws 35.

Projecting horizontally from the clamping screw 13 in contact with the upper surface of the motivating cam 23 is an annular flange 36. This flange has a multiplicity of tapped holes 37 spaced circumferentially to severally receive a set screw 38 which is adapted to project upward from either of a pair of countersink openings 39 and 40 (Fig. 5) formed in the cam 23. Either of the openings 39 or 40 may be placed in registry with any one of the openings 37 and the latter are equally spaced from each other but the opening 40 is located at such angle relative to the opening 39 as to be in registry with one of the openings 37 when the opening 39 is half way between two of the latter. By this arrangement for connecting the flange 36 to the cam 23, we provide for synchronizing the clamping or fully tightened position of the screw 13 with the indexing position of the pin 19 in the recesses 21. For use during the adjustment for synchronization, it is desirable to temporarily hold the pin member 20 in locked position relative to the recesses 21. This is accomplished by turning a small set screw 50 into engagement with the flange 27 (Figs. 2 and 3). As illustrated, the head of the screw 13 above the flange 36 is hexagonal and this screw may be turned by a crank handle 41 having a hub portion 42 fastened to the screw 13 by a set screw 43.

To facilitate fastening the base plate 9 upon the tool rest 10 of common type, the plate is formed with a pair of oppositely disposed arcuate slots 44, each adapted to receive a countersunk bolt 45 having its lower end portion threaded in a cross bar 46 fitting in a T-shaped way formed in the tool rest 10. The slots 44 extend in arcs which are concentric with the spindle 11 and of sufficient length to permit a wide range of angular adjustment of the base plate 9 relative to the tool rest. As shown in Fig. 1, the latter may comprise the compound tool rest of a lathe of common type, such rest being movable to and from the work by means of a traverse screw 47 and being mounted on the cross feed carriage 48 of a lathe having a bed 49.

In operation, assuming that the several tools are mounted on the holder 14, any of these tools may be selected and moved to operative position relative to the work merely by operating the handle 41 first in a counter-clockwise direction and then in the reverse direction to the starting position. When a tool is in operative position the pin 19 is firmly seated and locked in one of the indexing recesses 21 and the clamping screw 13 is in its tightened position wherein the tool holder 14 is clamped firmly against the base 9 with the flange 36 bearing on the cam 23 and the latter bearing on the top surface of the tool holder. This locked position of the indexing pin is illustrated in Figs. 3 and 7. To index another tool, the handle 41 is first turned counter-clockwise through an angle somewhat in excess of 180 degrees. During the initial 90 degrees of this motion the cam 23 revolves relatively to the tool holder 14 and base plate 9 and the pin 19, being released by the cam 23, is thrust upward by the spring 32, so that its upper member 26 projects in front of one of the shoulders 25 while the lower end member 20 of the pin is withdrawn from the recess 21 to approximately the position indicated in Fig. 8 where its lower end is free to move clockwise in one of the cam ways 22 but not in the reverse direction. Further movement of the clamping screw in a counter-clockwise direction causes the upper end of the pin 19 to engage one of the shoulders 25 and thereby rotates the tool holder counter-clockwise with the clamping screw while the lower end of the pin 19 rides up the incline of one of the ways 22 until it reaches the next recess 21 and is allowed to drop part way into the latter. If this brings the desired tool into operative relation to the work, rotation of the clamping screw is now reversed by appropriate operation of the handle 41, otherwise the counter-clockwise movement is continued until the required tool has been moved approximately to working position. As the clockwise movement of the handle starts, the pin member 20 catches in the first indexing recess 21 to be encountered and thereby stops rotation of the tool holder in a clockwise direction. Thereafter motion of the handle in this direction is continued until the clamping screw has been returned to clamping position and the indexing pin has been forced downward by the motivating cam surfaces 24.

This cam 23 is so designed relative to the depth of the recesses 21 that it forces the indexing pin 19 downward to a point where the spring 29 is compressed somewhat. From this it will be evident that the lower end member 20, upon reaching its fully seated position in one of the recesses 21, stops while the sleeve 28 and member 26 continue downward for a short distance. The spring 29 is, preferably, at least as stiff as the spring 32 so that the final seating of the pin is firmly established by the pressure of the spring 29. The pin 19 is actuated in the reverse direction by the spring 32 but as the flange 27 strikes the retaining ring 34 before the lower end of the pin 19 has been completely withdrawn from a recess 21, the pin coacts with the indexing recesses to prevent rotation of the tool holder in a clockwise direction when the screw 13 is turned to clamping position. By our accurately adjustable driving connection between this screw and the motivating cam 23, we facilitate proper synchronization of the indexing and clamping operations.

Our improved turret is adapted for use in a wide range of sizes, including units adapted for use with the smallest commercial machines, by reason of the fact that the several parts of our device are unusually compact, particularly with respect to the elevation of the tool holder above the tool rest surface of the lathe.

Having described our invention, what we claim as new and desire to protect by Letters Patent is:

1. A turret for a lathe having in combination, a base having a rigid, centrally located spindle projecting upward therefrom, a tool holder journaled on said spindle, a clamping screw threaded axially in said spindle and formed to clamp said tool holder on the base, a vertically extending indexing pin mounted eccentrically to said spindle and in parallel relation thereto, said pin having relative movable, upper and lower end portions adapted to project respectively from the upper and lower surfaces of said tool holder and said base being formed with indexing recesses severally adapted to receive the lower end portion of said pin, a sleeve formed on one of said end portions of the pin to slidably receive the other end portion thereof, a spring confined within said sleeve for normally extending said portions, one relative to the other, stop means for limiting relative movement of said portions of the pin, a motivating cam fixed on said screw for engaging the upper end portion of said pin to index the tool holder on the base and to compress said spring, said motivating cam being formed with a plurality of shoulders adapted to engage the upper end portion of said pin to rotate said body in one direction and resilient means associated with said pin for retracting it from indexing position.

2. In a device of the class described, a base, a tool holder revolubly mounted on said base, operating means adapted to clamp said holder on the base, an indexing pin mounted on said holder and having relative movable, opposite end portions adapted to project from the tool holder, said base being formed with indexing recesses severally adapted to receive one end portion of said pin to lock the holder on the base, a guide fixed on one of said end portions of the pin to slidably receive the other end portion thereof, a spring confined within said guide for normally extending said portions, one relative to the other, stop means for limiting relative movement of said portions of the pin, a motivating cam associated with said operating means for engaging an end portion of said pin to lock the tool holder on the base and to compress said spring, means associated with said operating means for rotating the tool holder in one direction and resilient means associated with said pin for retracting it from locking position.

3. In a device of the class described, a base, a tool holder revolubly mounted on said base, an indexing pin mounted on said holder and having opposite end portions normally projecting from the holder, indexing recesses being formed in said base to severally receive one end portion of said pin, operating means having a threaded connection with the base and engageable with the tool holder to clamp it on the base, a motivating cam associated with said operating means to engage one end portion of said pin to seat the opposite end portion thereof in either of said recesses, means associated with said operating means and formed to coact with said pin to rotate the tool holder in forward direction, resilient means for normally withdrawing said end portion of the pin from the several recesses, a spring interposed between the end portions of said pin for normally extending one end portion to project part way into said recesses and cam ways associated with said recesses in the base to actuate said pin to a position free of the several recesses and thereby permit rotation of the holder in the forward direction relative to the base.

4. A turret attachment for a lathe having in combination, a base, a tool holder journaled on said base to rotate thereon, an indexing pin mounted on said holder eccentrically to the journal axis and parallel thereto, said pin having relatively movable upper and lower end members adapted to project from the tool holder, indexing recesses being formed in said base to severally receive the lower end member of said pin for locking the tool holder on the base, operating means having a threaded connection with said base and engageable with the tool holder to clamp it on the base and a motivating cam carried by said operating means and projecting above the upper end member of said pin to actuate said pin downward and to extend the lower end member thereof into indexing relation to either of said recesses, said cam having shoulder surfaces severally adapted to coact with the upper end member of said pin to rotate the tool holder in one direction.

5. A turret attachment for a lathe having in combination, a base, a tool holder journaled on said base to rotate thereon, an indexing pin mounted on the holder eccentrically to the journal axis and parallel thereto, said pin having relatively retractile upper and lower end members adapted to project from the top and bottom surfaces respectively of the tool holder, a spring interposed between said end members to normally extend one of them relative to the other, indexing recesses being formed in said base to receive the lower end member of said pin, operating means threaded in said base and engageable with the tool holder to clamp it on the base, a cam carried by said operating means and projecting above the upper end member of said pin to actuate said pin downward and extend the lower end member thereof into indexing relation to either of said recesses, said cam being formed with vertical surfaces disposed to coact with the upper end member of said pin to rotate the tool holder in one direction and resilient means for retracting said lower end member from said recess and for retaining the upper end member in contact with said cam.

6. A turret attachment for a lathe having in combination, a base, a tool holder journaled on said base to rotate thereon, an indexing pin mounted on said holder eccentrically to the journal axis and parallel thereto, said pin having relatively movable upper and lower end members adapted to project from the tool holder and indexing recesses being formed in said base to severally receive the lower end member of said pin for locking the tool holder on the base, operating means threaded in said base and engageable with the tool holder to clamp it on the base, a motivating cam associated with said operating means and positioned to actuate said pin downward and extend the lower end member thereof into indexing relation to either of said recesses, a spring interposed between the end members of said pin for normally extending one of said members relative to the other, a stop for limiting the relative extension of said members, means engaging the upper end member of the pin to cause the lower end member thereof to normally project part way into one of said recesses and inclined camways formed on said base and severally associated with the respective recesses therein to actuate the lower end member of said pin upward to a position free of the several recesses, thereby permitting rotation of said holder in one direction relative to the base.

7. A turret attachment for a lathe having in combination, a base, a tool holder journaled on said base to rotate thereon, an indexing pin mounted on the holder eccentrically to the journal axis and parallel thereto, said pin having relatively movable upper and lower end members adapted to project from opposite faces respectively of the tool holder, indexing recesses being formed in said base to receive the lower end member of said pin, operating means having a threaded connection with said base and engageable with the tool holder to clamp it on the base, a cam projecting above the upper end member of said pin to actuate said pin downward and extend the lower end member thereof into indexing relation to either of said recesses, resilient means for withdrawing the lower end member of said pin from said recesses and an angularly adjustable connection between said operating means and said cam whereby the indexing position of the cam may be correlated with the clamping position of the operating means.

RUSSELL W. WALDO.
LEON J. RATTE.